United States Patent
Lah et al.

(10) Patent No.: US 10,081,766 B2
(45) Date of Patent: Sep. 25, 2018

(54) RETRACTABLE CENTER FEED INJECTION DEVICE

(71) Applicant: DeltaValve, LLC, Sandy, UT (US)

(72) Inventors: Ruben F. Lah, South Jordan, UT (US); Kenneth Krause, Sandy, UT (US); Gary Larsen, West Jordan, UT (US)

( * ) Notice: Subject to any disclaimer, the term of this patent is extended or adjusted under 35 U.S.C. 154(b) by 279 days.

(21) Appl. No.: 15/185,324

(22) Filed: Jun. 17, 2016

(65) Prior Publication Data

US 2017/0362510 A1    Dec. 21, 2017

(51) Int. Cl.
| | |
|---|---|
| *C10B 31/12* | (2006.01) |
| *B01J 4/00* | (2006.01) |
| *C10B 1/04* | (2006.01) |
| *C10B 31/06* | (2006.01) |
| *C10B 55/00* | (2006.01) |
| *B05B 15/70* | (2018.01) |

(52) U.S. Cl.
CPC ............... *C10B 31/12* (2013.01); *B01J 4/002* (2013.01); *B01J 4/007* (2013.01); *B05B 15/70* (2018.02); *C10B 1/04* (2013.01); *C10B 31/06* (2013.01); *C10B 55/00* (2013.01)

(58) Field of Classification Search
CPC ........... B01J 4/002; B01J 4/007; B05B 15/70; C10B 1/04; C10B 31/06; C10B 31/12
See application file for complete search history.

(56) References Cited

U.S. PATENT DOCUMENTS 4,043,471 A * 8/1977 Trumbull .................. B01J 3/02
                                                    414/287
8,545,680 B2 * 10/2013 Lah .......................... B01J 4/002
                                                    196/127

* cited by examiner

*Primary Examiner* — Renee E Robinson
*Assistant Examiner* — Gabriel E Gitman
(74) *Attorney, Agent, or Firm* — Michael F. Krieger; Kirton McConkie

(57) ABSTRACT

A retractable center feed injection device can be employed to feed residual oil into a coke drum as part of a delayed coking process. The retractable center feed injection device can include a housing within which the injection nozzle slides between an extended and a retracted position. A feed inlet is positioned on an opposite side of the coke drum from the retractable center feed injection device. When in the extended position, the injection nozzle can couple with the feed inlet and thereby form an extension of the feed inlet into the center of the coke drum. In this way, the residual oil never flows through the housing.

20 Claims, 9 Drawing Sheets

RETRACTABLE CENTER FEED INJECTION DEVICE

CROSS-REFERENCE TO RELATED APPLICATIONS

N/A

BACKGROUND

The present invention is generally directed to a device for injecting heated residual oil into a coke drum as part of a delayed coking process. More particularly, the present invention is directed to a retractable center feed injection device which allows feeding the residual oil into the coke drum from a bottom and center of the coke drum using side-feed entry.

Delayed coking is one process by which petroleum coke can be produced. As a brief overview, the delayed coking process involves heating byproducts of the oil refining process, known as residual oil, in a furnace to its thermal cracking temperature of approximately 485° to 505° C. This heated residual oil is then pumped into a coke drum where the heat and pressure that build up within the coke drum complete the thermal cracking process. As the heated residual oil cools, petroleum coke is formed which can then be removed from the coke drum.

It is typically desirable to feed the heated residual oil from the bottom and center of the coke drum. One reason for this is to minimize the uneven heating of the walls of the coke drum that may otherwise occur if the residual oil is fed towards one side of the wall. To accomplish feeding the residual oil from the center, various so-called "center feed" systems have been developed. These center feed systems employ an injection nozzle which can be inserted into and retracted from the center of the coke drum. Examples of center feed systems are described in U.S. Pat. Nos. 8,702,911 and 8,545,680.

These prior art center feed systems employ an injection nozzle that is contained within an inlet sleeve through which the heated residual oil is fed into the injection nozzle. In other words, the combination of the inlet sleeve and the injection nozzle forms the feedline. As a result, all components, including those used to extend and retract the injection nozzle must be configured to withstand the high temperature and pressure of the heated residual oils that they carry and are therefore relatively costly. Additionally, due to the harsh environment in which these components operate, they can require frequent maintenance leading to downtime in the delayed coking process.

BRIEF SUMMARY

The present invention is directed to a retractable center feed injection device that can be employed to feed residual oil into a coke drum as part of a delayed coking process. The retractable center feed injection device of the present invention can include a housing within which the injection nozzle slides between an extended and a retracted position. Unlike prior art center feed systems, however, this housing is not employed as part of the feed inlet. Instead, a feed inlet is positioned on a side of the coke drum, preferably the opposite side from the retractable center feed injection device. When in the extended position, the injection nozzle is coupled with the feed inlet and thereby forms an extension of the feed inlet into the center of the coke drum. In this way, the residual oil never flows through the housing of the injection nozzle, only through the extended nozzle portion.

In some embodiments, the present invention is implemented as a retractable center feed injection device for use on a coke drum. The retractable center feed injection device can include a housing configured to couple to a sidewall of a coke drum in alignment with a first opening in the sidewall, and an injection nozzle contained within the housing. The injection nozzle has a first end and a second end and is configured to slide between a retracted position in which the first end may not extend into the coke drum and an extended position in which the first end extends into the coke drum. The retractable center feed injection device also includes an actuator that is coupled to the second end of the injection nozzle and configured to slide the injection nozzle between the retracted position and the extended position. The injection nozzle includes a chamber positioned towards the first end and having one or more outlet openings that are oriented into the drum and an inlet opening that extends out through the first end such that residual oil can be flowed into the chamber via the inlet opening and out of the chamber via the one or more outlet openings.

In another embodiment, the present invention is implemented as a coke drum center feed system that includes: a coke drum having a sidewall with a first opening and a second opening opposite and aligned with the first opening; a feed inlet coupled to the second opening and configured to feed residual oil into the coke drum via the second opening; and a retractable center feed injection device. The retractable center feed injection device can include: a housing coupled to the sidewall in alignment with the first opening; an injection nozzle contained within the housing, the injection nozzle having a first end and a second end, the injection nozzle configured to slide between a retracted position in which the first end does not extend through the first opening into an interior of the coke drum and an extended position in which the injection nozzle extends across the interior of the coke drum to couple the first end with the feed inlet, the injection nozzle including a chamber positioned towards the first end, the chamber including an inlet opening that aligns with the feed inlet and one or more outlet openings that are oriented upwardly such that the residual oil fed through the feed inlet when the injection nozzle is in the extended position flows into the chamber via the inlet opening and out of the chamber via the one or more outlet openings; and an actuator for sliding the injection nozzle between the retracted position and the extended position.

In another embodiment, the present invention is implemented as a retractable center feed injection device that includes: a housing configured to couple to a sidewall of a coke drum in alignment with a first opening in the sidewall; an injection nozzle contained within the housing; an actuator coupled to the injection nozzle and configured to slide the injection nozzle between a retracted position and an extended position; and a feed inlet configured to couple to the sidewall of the coke drum in alignment with a second opening in the sidewall that is opposite the first opening. When the injection nozzle is in the retracted position, a first end of the injection nozzle does not extend into an interior of the coke drum. Whereas, when the injection nozzle is in the extended position, the first end of the injection nozzle extends across the interior of the coke drum and couples with the feed inlet. The first end forms a channel through which residual oil flowed through the feed inlet can be injected into the interior of the coke drum.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
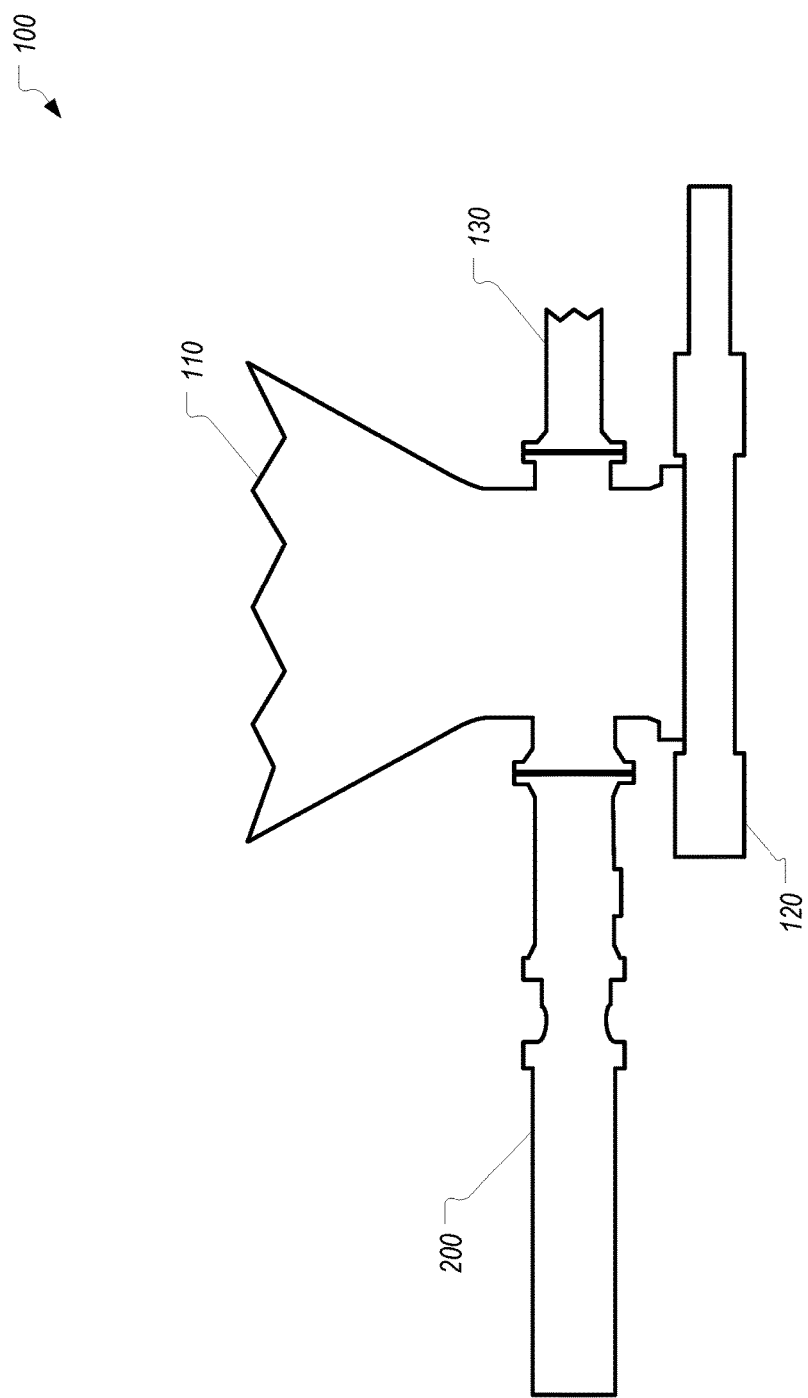
FIG. 1 illustrates a delayed coking system in accordance with embodiments of the present invention.

FIG. 1 generally depicts a delayed coking system 100 that includes a retractable center feed injection device in accordance with embodiments of the present invention. Delayed coking system 100 includes a coke drum 110 into which heated residual oil can be injected as part of a delayed coking process. A bottom unheading valve 120 is coupled to a bottom of coke drum 110 and can be opened to allow coke to fall out of coke drum 110 after the delayed coking process has completed. Coke drum 110 can be configured to allow a feed inlet 130 and a retractable center feed injection device 200 to be coupled to the coke drum on opposing sides of the coke drum. For example, coke drum 110 may include flanges forming openings on opposing sides of the coke drum. In this specification and the claims, the term coke drum should be construed as encompassing the entirety of a coke drum or a component (e.g., a spool) that is coupled to and forms part of the coke drum. For example, in some embodiments, coke drum 110 as described herein can represent a bottom-most portion of a coke drum that can be installed on an existing coke drum. Therefore, the present invention should not be limited to any particular configuration of a coke drum to which the retractable center feed injection device may be coupled. Although it is presently preferable to inject the residual product upward, it will be understood that the resolved product could also be injected in any direction. Additionally, although all of the housing in the preferred embodiments is extended to the drum, it will be appreciated that some minor portions of the housing such as an attachment flange may be located inside the drum. It is preferable to locate as much of the housing outside of the drum as possible.

As was described in the background, various center feed systems exist which could be employed to feed residual oil into coke drum 110 from a center of the coke drum. However, in each of these prior art center feed systems, the residual oil would be fed through the center feed system. With reference to FIG. 1, this would be akin to feeding the residual oil through the portion of retractable center feed injection device 200 that is located outside of coke drum 110. In contrast, in accordance with embodiments of the present invention, retractable center feed injection device 200 and feed inlet 130 can be configured to allow residual oil to be fed into coke drum 110 without ever passing through any portion of retractable center feed injection device 200 that is located external to coke drum 110 (e.g., housing 201). This configuration is shown in FIGS. 2A-3C.

Figure 2A:
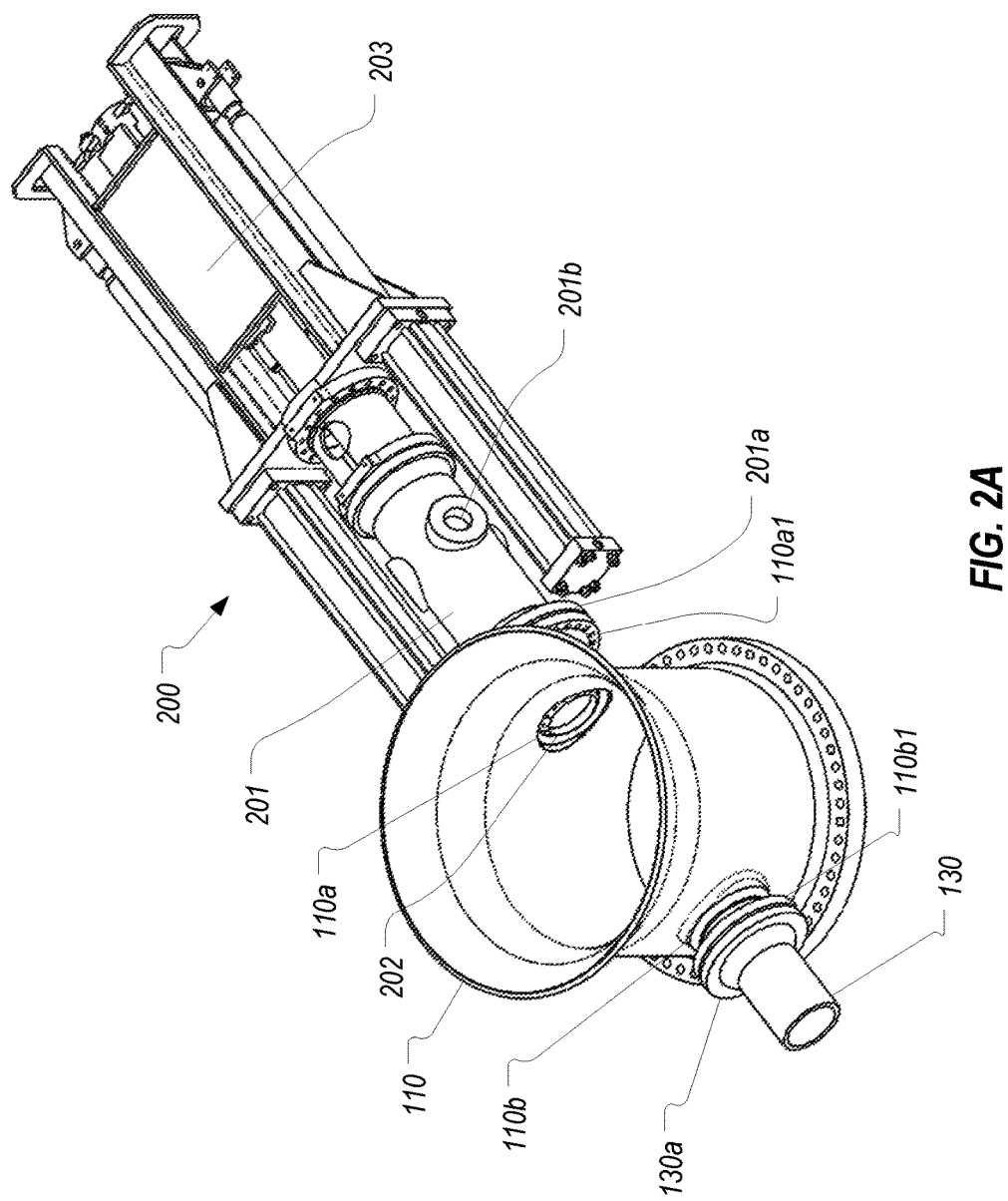
FIGS. 2A-2C illustrate an isometric view, a cross-sectional side view, and a top view respectively of a retractable center feed injection device in a retracted position.
Figure 2B:
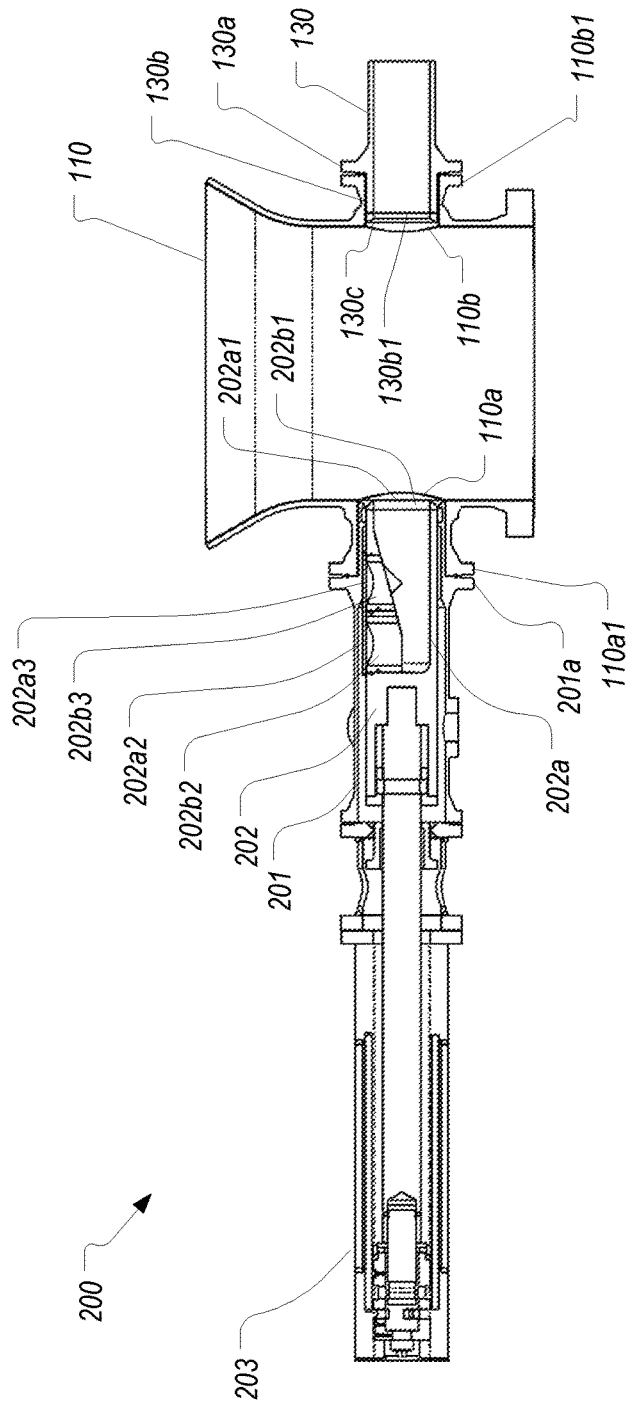
Figure 2C:
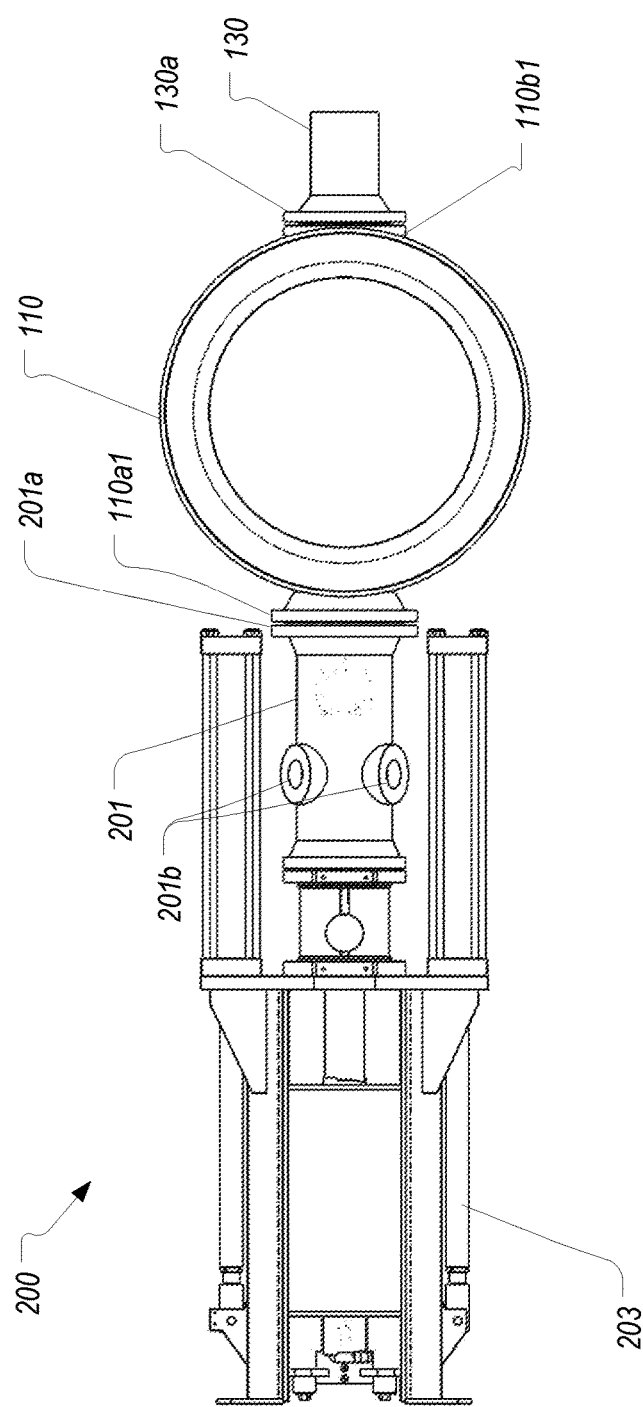
Figure 3A:
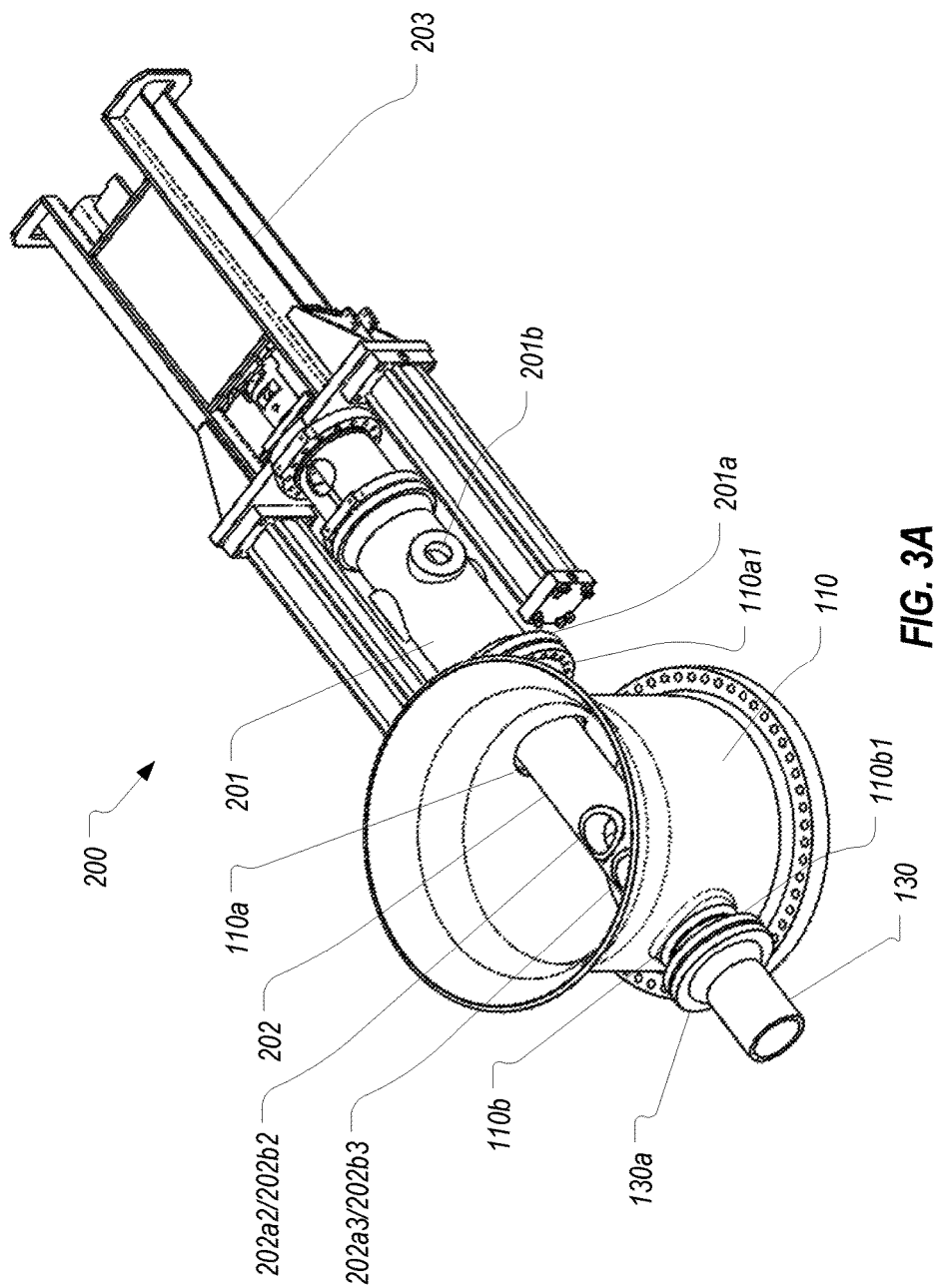
FIGS. 3A-3C illustrate an isometric view, a cross-sectional side view, and a top view respectively of the retractable center feed injection device in an extended position.
Figure 3B:
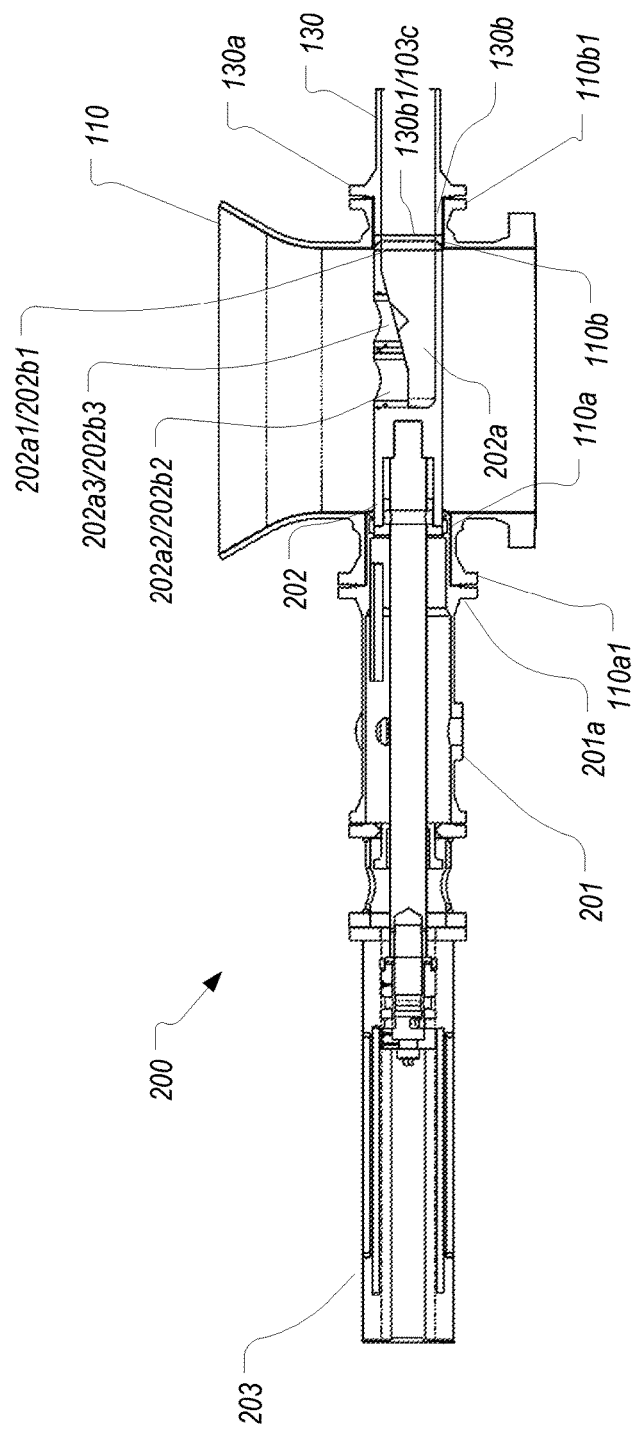
Figure 3C:
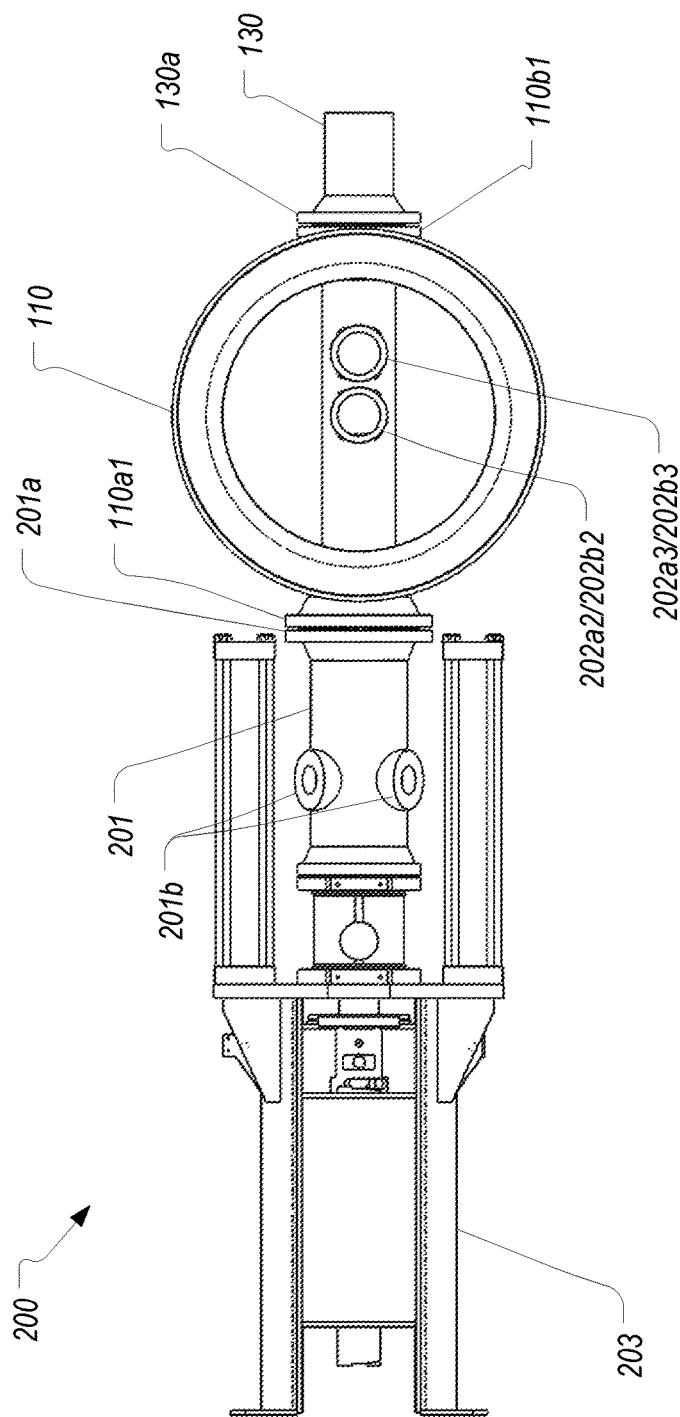

In FIGS. 2A-2C, retractable center feed injection device 200 is shown in a retracted position, while in FIGS. 3A-3C, retractable center feed injection device 200 is shown in an extended position. While in the extended position, retractable center feed injection device 200 can form a channel with feed inlet 130 through which residual oil can be injected into coke drum 110. After residual oil has been injected, retractable center feed injection device 200 can be returned to the retracted position until it is again desired to inject residual oil (i.e., until the next coking cycle).

Retractable center feed injection device 200 includes a housing 201, an injection nozzle 202 positioned within housing 201, and an actuator 203 that is configured to move injection nozzle 202 between the retracted position and the extended position. Any suitable type of actuator can be employed, and therefore actuator 203 will not be described in detail. Suffice it to say that actuator 203 includes a slidable component that couples to injection nozzle 202 for the purpose of sliding injection nozzle 202 between the two positions.

Housing 201 can include a flange 201a by which housing 201 is coupled to coke drum 110 (e.g., via flange 110a1 on coke drum 110). Housing 201 may also include a number of openings 201b by which the interior of housing 201 can be pressurized (e.g., with steam) to thereby prevent the flow of materials from within coke drum 110 into housing 201. In other words, the small gap between the outer surface of injection nozzle 202 and the inner surface of housing 201 can be pressurized to substantially match or approximate the pressure that will exist within coke drum 110 during the coking process. Additionally, housing 201 may include a number of components/structures that form a seal against the outer surface of injection nozzle 202 which allow housing 201 to be pressurized and also block the flow of materials into housing 201.

As best shown in FIG. 2B, injection nozzle 202 can have a length that causes a tip of the injection nozzle to be positioned near opening 110a of coke drum 110. Housing 201 may also include a portion that extends beyond flange 201a and into flange 110a1 so that the tip of housing 201 is also positioned at or near opening 110a. The tolerances between opening 110a, housing 201, and injection nozzle 202 can be such that a tight seal is formed at opening 110a thereby preventing the flow of materials out through the junction between flanges 110a1 and 201a.

Injection nozzle 202 can include a chamber 202a positioned at the end of the injection nozzle that inserts into coke drum 110. Chamber 202a includes an inlet opening 202a1 that is oriented towards and aligned with feed inlet 130 on the opposing side of coke drum 110. In some embodiments, a nozzle seat 202b1 can be coupled at the tip of injection nozzle 202 and around inlet opening 202a1. When nozzle seat 202b1 is included, the length of injection nozzle 202 as well as the size of nozzle seat 202b1 can be configured such that nozzle seat 202b1 sits at or slightly within opening 110a when injection nozzle 202 is in the retracted position (i.e., nozzle seat 202b1 can be configured to not extend into coke drum 110 when injection nozzle 202 is in the retracted position). The role of this nozzle seat 202b1 will be further described below. However, in some embodiments, injection nozzle 202 may not include nozzle seat 202b1. In such cases, the tip of injection nozzle 202 can be configured with a shape that corresponds with the shape of the depicted nozzle seat 202b1.

Chamber 202a can also include outlet openings 202a2 and 202a3 which are oriented upwardly and spaced from the tip of injection nozzle 202 such that openings 202a2 and 202a3 will be positioned at or near a center of coke drum 110 when injection nozzle 202 is in the extended position. Outlet openings 202a2 and 202a3 can include inserts 202b2 and 202b3 respectively which can be used to direct the flow of residual oil as it exits chamber 202a. In some embodiments, inserts 202b2 and 202b3 can be replaceable to facilitate maintaining injection nozzle 202.

Feed inlet 130 can be configured to couple to coke drum 110 via a flange 110b1 that forms an opening 110b that is aligned with opening 110a. Feed inlet 130 can include a flange 130a that is configured to couple to flange 110b1 and a portion 130b that extends inwardly through flange 110b1 when flange 130a is coupled to flange 110b1. The length of portion 130b can be configured such that its tip is positioned near opening 110b. In some embodiments, a feed inlet seat 130c can be coupled to the tip of portion 130b around opening 130b1. As with nozzle seat 202b1, feed inlet seat 130c can be positioned at or slightly within opening 110b such that it does not extend into coke drum 110. In other embodiments, however, feed inlet 130 may not include a feed inlet seat 130c. In such cases, the tip of portion 130b can be configured with the same shape as that of the depicted feed inlet seat 130c.

Figure 4:
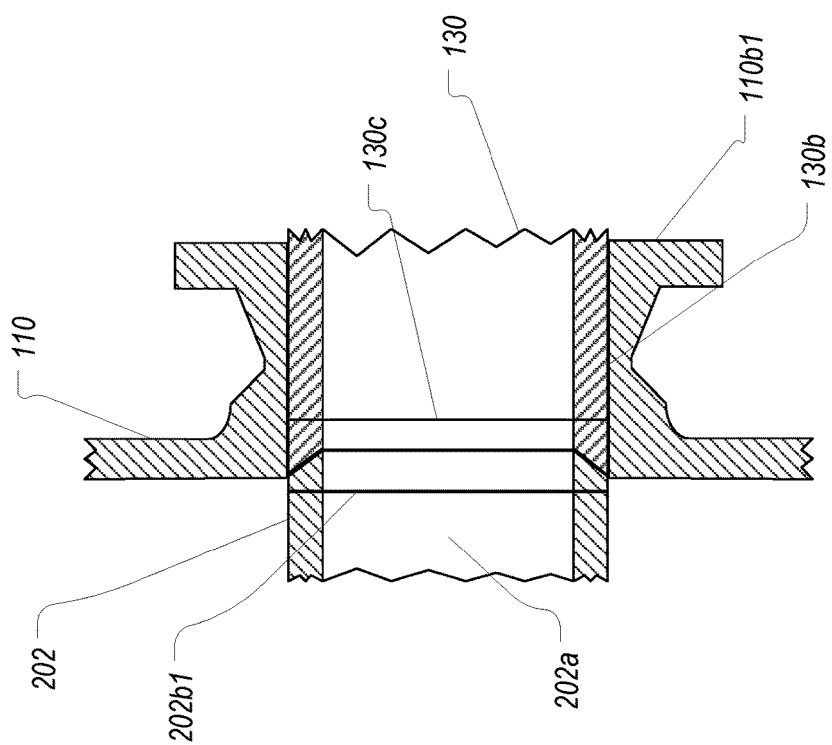
FIG. 4 illustrates a detailed view of the interface between an injection nozzle and a feed inlet through which residual oil is fed into a coke drum.

The shapes of nozzle seat 202b1 and feed inlet seat 130c can correspond to one another such that a seal can be formed when nozzle seat 202b1 is pressed against feed inlet seat 130c. This is best shown in FIGS. 3B and 4. When injection nozzle 202 is slid into the extended position, and due to openings 110a and 110b being aligned, nozzle seat 202b1 will insert into feed inlet seat 130c (or alternatively, feed inlet seat 130c could be configured to insert into nozzle seat 202b1). Due to the force applied by actuator 203 on injection nozzle 202, the interface between nozzle seat 202b1 and feed inlet seat 130c will form a seal when injection nozzle 202 is in the extended position and residual oil is fed through chamber 202a.

Figure 5:
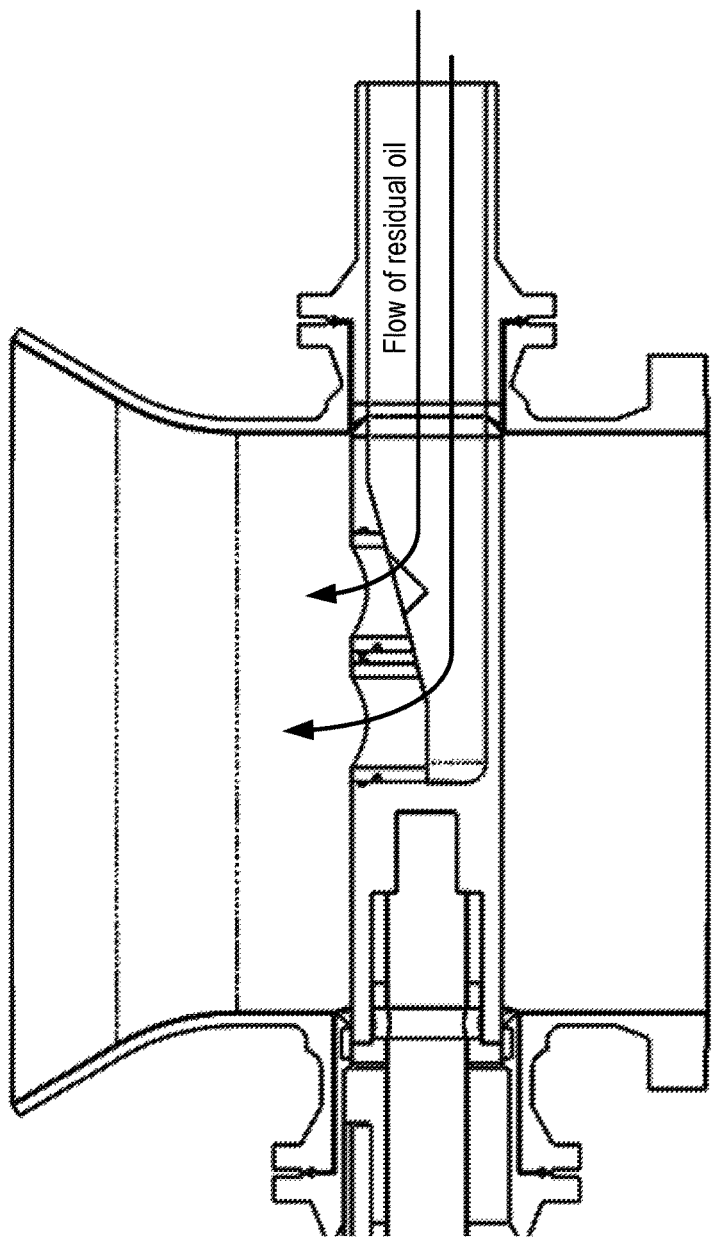
FIG. 5 illustrates the direction of flow of residual oil through the retractable center feed injection device and into the coke drum.

FIG. 5 illustrates how residual oil supplied through feed inlet 130 can enter into chamber 202a through inlet opening 202a1 and then exit chamber 202a via outlet openings 202a2 and 202a3. As indicated, the residual oil never passes through any component of retractable center feed injection device 200 that is positioned exterior to coke drum 110, such as, for example, housing 201. Instead, the residual oil only flows through the portion of injection nozzle 202 that is positioned within coke drum 110. For this reason, housing 201 and the other exterior components of retractable center feed injection device 200 need not be designed to accommodate the harsh conditions that would otherwise be created if heated residual oil were flowed through these components. In this way, the design and maintenance of retractable center feed injection device 200 is simplified.

In addition to forming a seal, nozzle seat 202b1 and feed inlet seat 130c can function to simplify the maintenance of retractable center feed injection device 200. In particular, both nozzle seat 202b1 and feed inlet seat 130c can be configured to be removable from injection nozzle 202 and feed inlet 130 respectively. Therefore, as these seats become worn, the seats alone can be replaced without needing to replace injection nozzle 202 and/or feed inlet 130. In fact, due to their design, these seats can be replaced in situ (e.g., by lowering an individual into coke drum 110 to remove the seats while injection nozzle 202 is in the retracted (or at least in a partially retracted) position.

Although it may be preferred to employ one or both of nozzle seat 202b1 and feed inlet seat 130c, in some embodiments, retractable center feed injection device 200 may be designed to include only one or neither of nozzle seat 202b1 or feed inlet seat 130c. As indicated above, when only one or no seats are employed, injection nozzle 202 and feed inlet 130 can still be configured to couple in a similar manner as described above when both seats are included such that a seal will still be formed when injection nozzle 202 is in the extended position.

Another benefit of the design of retractable center feed injection device 200 is that it allows residual oil to be fed into coke drum 110 even when the retractable center feed injection device may not be operating properly or may be undergoing external maintenance. For example, if for any reason injection nozzle 202 cannot be slid in the extended position, residual oil may still be fed through feed inlet 130 to thereby fill coke drum 110. In other words, retractable center feed injection device 200 allows coke drum 110 to be filled via either a center feed or a side feed process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A retractable center feed injection device for use on a coke drum comprising:
   a housing configured to couple to a sidewall of a coke drum in alignment with a first opening in the sidewall;
   an injection nozzle contained within the housing, the injection nozzle having a first end and a second end, the injection nozzle being configured to slide between a retracted position and an extended position in which the first end extends into the coke drum; and
   an actuator that is coupled to the second end of the injection nozzle and configured to slide the injection nozzle between the retracted position and the extended position;
   wherein the injection nozzle includes a chamber positioned towards the first end and having one or more outlet openings that are oriented into the drum and an inlet opening that extends out through the first end such that residual oil can be flowed into the chamber via the inlet opening and out of the chamber via the one or more outlet openings.

2. The retractable center feed injection device of claim 1, further comprising:
   a feed inlet configured to couple to the sidewall of the coke drum in alignment with a second opening in the sidewall, the second opening being opposite the first opening, the first end of the injection nozzle coupling with the feed inlet when the injection nozzle is in the extended position.

3. The retractable center feed injection device of claim 2, wherein the first end of the injection nozzle inserts into the feed inlet.

4. The retractable center feed injection device of claim 2, wherein the injection nozzle comprises:
   a nozzle seat coupled to the first end of the injection nozzle around the inlet opening, the nozzle seat configured to couple with the feed inlet when the injection nozzle is in the extended position.

5. The retractable center feed injection device of claim 4, wherein the inlet opening comprises:
   a feed inlet seat positioned at a tip of the feed inlet, the feed inlet seat configured to couple with the nozzle seat when the injection nozzle is in the extended position.

6. The retractable center feed injection device of claim 5, wherein the feed inlet seat is positioned inside the second opening such that the feed inlet seat does not extend into an interior of the coke drum, the nozzle seat extending into the second opening when the injection nozzle is in the extended position.

7. The retractable center feed injection device of claim 1, wherein the injection nozzle comprises:
   a nozzle seat coupled to the first end of the injection nozzle around the inlet opening.

8. A coke drum center feed system comprising:
   a coke drum having a sidewall with a first opening and a second opening opposite and aligned with the first opening;
   a feed inlet coupled to the second opening and configured to feed residual oil into the coke drum via the second opening; and
   a retractable center feed injection device comprising:
      a housing coupled to the sidewall in alignment with the first opening;
      an injection nozzle contained within the housing, the injection nozzle having a first end and a second end, the injection nozzle configured to slide between a retracted position in which the first end does not extend through the first opening into an interior of the coke drum and an extended position in which the injection nozzle extends across the interior of the coke drum to couple the first end with the feed inlet, the injection nozzle including a chamber positioned towards the first end, the chamber including an inlet opening that aligns with the feed inlet and one or more outlet openings that are oriented upwardly such that the residual oil fed through the feed inlet when the injection nozzle is in the extended position flows into the chamber via the inlet opening and out of the chamber via the one or more outlet openings; and
      an actuator for sliding the injection nozzle between the retracted position and the extended position.

9. The coke drum center feed system of claim 8, wherein the injection nozzle includes a nozzle seat coupled to the first end around the inlet opening.

10. The coke drum center feed system of claim 9, wherein the nozzle seat couples with the feed inlet.

11. The coke drum center feed system of claim 10, wherein the nozzle seat inserts into the feed inlet.

12. The coke drum center feed system of claim 11, wherein the feed inlet includes a feed inlet seat and the nozzle seat inserts into the feed inlet seat to couple the injection nozzle to the feed inlet.

13. The coke drum center feed system of claim 10, wherein the feed inlet includes a feed inlet seat and the nozzle seat couples with the feed inlet seat.

14. The coke drum center feed system of claim 13, wherein the nozzle seat is removable from the injection nozzle.

15. The coke drum center feed system of claim 13, wherein the feed inlet seat is removable from the feed inlet.

16. The coke drum center feed system of claim 8, wherein, when the injection nozzle is the in extended position, the outlet openings are positioned near a center of the interior of the coke drum.

17. The coke drum center feed system of claim 8, wherein, when the injection nozzle is in the extended position, the chamber is positioned entirely external to the housing.

18. A retractable center feed injection device comprising:
   a housing configured to couple to a sidewall of a coke drum in alignment with a first opening in the sidewall;
   an injection nozzle contained within the housing;
   an actuator coupled to the injection nozzle and configured to slide the injection nozzle between a retracted position and an extended position; and
   a feed inlet configured to couple to the sidewall of the coke drum in alignment with a second opening in the sidewall that is opposite the first opening;
   wherein, when the injection nozzle is in the retracted position, a first end of the injection nozzle does not extend into an interior of the coke drum; and
   wherein, when the injection nozzle is in the extended position, the first end of the injection nozzle extends across the interior of the coke drum and couples with the feed inlet, the first end forming a channel through which residual oil flowed through the feed inlet can be injected into the interior of the coke drum.

19. The retractable center feed injection device of claim 18, wherein the channel is formed by a chamber having an inlet opening that extends out through the first end and one or more outlet openings that are oriented upwardly.

20. The retractable center feed injection device of claim 18, wherein the first end of the injection nozzle includes a nozzle seat and the feed inlet includes a feed inlet seat, the nozzle seat coupling with the feed inlet seat when the injection nozzle is in the extended position.

* * * * *